US012433977B2

(12) United States Patent
Janik

(10) Patent No.: US 12,433,977 B2
(45) Date of Patent: Oct. 7, 2025

(54) DEVICE AND METHOD FOR EXTRACORPOREAL BLOOD TREATMENT AND METHOD FOR THE BALANCE CONTROL OF A DIALYSIS LIQUID IN AN EXTRACORPOREAL BLOOD TREATMENT

(71) Applicant: B. Braun Avitum AG, Melsungen (DE)

(72) Inventor: Waldemar Janik, Melsungen (DE)

(73) Assignee: B. Braun Avitum AG, Melsungen (DE)

( * ) Notice: Subject to any disclaimer, the term of this patent is extended or adjusted under 35 U.S.C. 154(b) by 563 days.

(21) Appl. No.: 17/635,869

(22) PCT Filed: Aug. 21, 2020

(86) PCT No.: PCT/EP2020/073532
§ 371 (c)(1),
(2) Date: Feb. 16, 2022

(87) PCT Pub. No.: WO2021/037744
PCT Pub. Date: Mar. 4, 2021

(65) Prior Publication Data
US 2022/0288291 A1     Sep. 15, 2022

(30) Foreign Application Priority Data
Aug. 23, 2019 (DE) .................. 10 2019 122 704.6

(51) Int. Cl.
*A61M 1/16* (2006.01)
(52) U.S. Cl.
CPC ........ *A61M 1/1609* (2014.02); *A61M 1/1635* (2014.02); *A61M 2205/3303* (2013.01);
(Continued)

(58) Field of Classification Search
None
See application file for complete search history.

(56) References Cited

U.S. PATENT DOCUMENTS 3,993,945 A * 11/1976 Warmoth ............... G01N 27/07
324/437
4,508,622 A    4/1985 Polaschegg et al.
(Continued)

FOREIGN PATENT DOCUMENTS

DE         3601223 A1    7/1987
DE         69916053      3/2005
(Continued)

OTHER PUBLICATIONS

Castellarnau, Real-time Kt/V determination by ultraviolet absorbance in spent dialysate: technique validation, 2010 (Year: 2010).*
(Continued)

*Primary Examiner* — Bradley R Spies
*Assistant Examiner* — Jeannie McDermott
(74) *Attorney, Agent, or Firm* — Christopher A. Rothe; CM Law

(57) ABSTRACT

A device and method for extracorporeal blood treatment, in particular for hemodialysis, and a method for the balance control of a dialysis fluid in an extracorporeal blood treatment. Sodium balancing can be implemented with improved accuracy during the blood treatment, because distorting effects in the conductivity measurement of the used dialysis fluid can be corrected by taking into account the loading of the used dialysis fluid with urophanic substances, which loading is sensed by an additional measuring apparatus.

16 Claims, 1 Drawing Sheet

(52) U.S. Cl.
CPC ............ *A61M 2205/3313* (2013.01); *A61M 2205/3317* (2013.01); *A61M 2205/3368* (2013.01)

(56) References Cited

U.S. PATENT DOCUMENTS

| | | | |
|---|---|---|---|
| 5,342,527 | A | 8/1994 | Chevallet et al. |
| 6,666,840 | B1 | 12/2003 | Falkvall et al. |
| 8,764,987 | B2 | 7/2014 | Gross et al. |
| 2013/0199998 | A1* | 8/2013 | Kelly .................. A61M 1/1696 210/85 |
| 2013/0237896 | A1* | 9/2013 | Meibaum ............ A61M 1/3612 604/5.04 |
| 2018/0140761 | A1* | 5/2018 | Rovatti ............... A61M 1/1666 |
| 2019/0022292 | A1 | 1/2019 | Janik |
| 2020/0179583 | A1* | 6/2020 | Hobot .................. A61M 1/284 |

FOREIGN PATENT DOCUMENTS

| | | |
|---|---|---|
| DE | 102017116097 A1 | 1/2019 |
| EP | 0097366 B1 | 1/1984 |
| WO | 2010112223 A1 | 10/2010 |
| WO | 2018114277 A1 | 6/2018 |

OTHER PUBLICATIONS

Rovati, UV-LEDs for Monitoring Dialysis Adequacy, 2009 (Year: 2009).*
Uhlin, Optical Monitoring of Dialysis Dose, 2013 (Year: 2013).*
Fridolin, Measurement of solutes in dialysate using UV absorption, estimation of removal of overall toxins. (Year: 2001).*
Arund, Do Only Small Uremic Toxins, Chromophores, Contribute to the Online Dialysis Dose Monitoring by UV Absorbance. (Year: 2012).*
Basile et al., "It is Time to Individualize the Dialysate Sodium Prescription," Seminars in Dialysis, Division of Nephrology, vol. 29, No. 1, Jan.-Feb. 2016, 4 pages.
Flythe et al., "Rapid fluid removal during dialysis is associated with cardiovascular morbidity and mortality," NIH Public Access, Kidney Int. Jul. 1, 2011, 16 pages.
Hecking et al., "Sodium Setpoint and Sodium Gradient: Influence on Plasma Sodium Change and Weight Gain," Original Report: Patient-Oriented, Translational Research, American Journal of Nephrology, Dec. 11, 2010, 10 pages.
Keen, et al., "The Association of the Sodium "Setpoint" to Interdialytic Weight Gain and Blood Pressure in Hemodialysis Patients," PubMed, Nov. 1, 2007, Abstract, 1 page.
Kuhlmann et al., "Zero Diffusive Sodium Balance in Hemodialysis Provided by an Algorithm-Based Electrolyte Balancing Controller: A Proof of Principle Clinical Study," Artificial Organs, Jul. 2018, 9 pages.
Peixoto et al., "Long-Term Stability of Serum Sodium in Hemodialysis Patients," Karger AG, Basel, 2010, Abstract, 1 page.
Saran et al., "Longer treatment time and slower ultrafiltration in hemodialysis: Associations with reduced mortality in the DOPPS," Kidney International, Feb. 15, 2006, 8 pages.
Search Report received in Application No. PCT/EP2020/073532 dated Nov. 3, 2020, with translation, 7 pages.
Search report received in German Application No. 10 2019 122 704.6 dated May 4, 2020, with translation, 15 pages.
Mendoza, J. M., et al., "Dialysate sodium and sodium gradient in maintenance hemodialysis: a neglected sodium restriction approach?", Nephrol Dial Transplant, 2011, 26, 1281-1287, 7 pages.
De Paula, F. M., et al., "Clinical consequences of an individualized dialysate sodium prescription in hemodialysis patients," Kidney International, 2004, 66, 1232-1238, 7 pages.
Written Opinion received in International Application No. PCT/EP2020/073532 dated Nov. 3, 2020, with translation, 13 pages.
Office Action received in Chinese Application No. 202080059809.5 dated Nov. 15, 2024, with translation, 18 pages.
Office Action received in Chinese Application No. 202080059809.5 dated May 7, 2025, with translation, 16 pages.

* cited by examiner

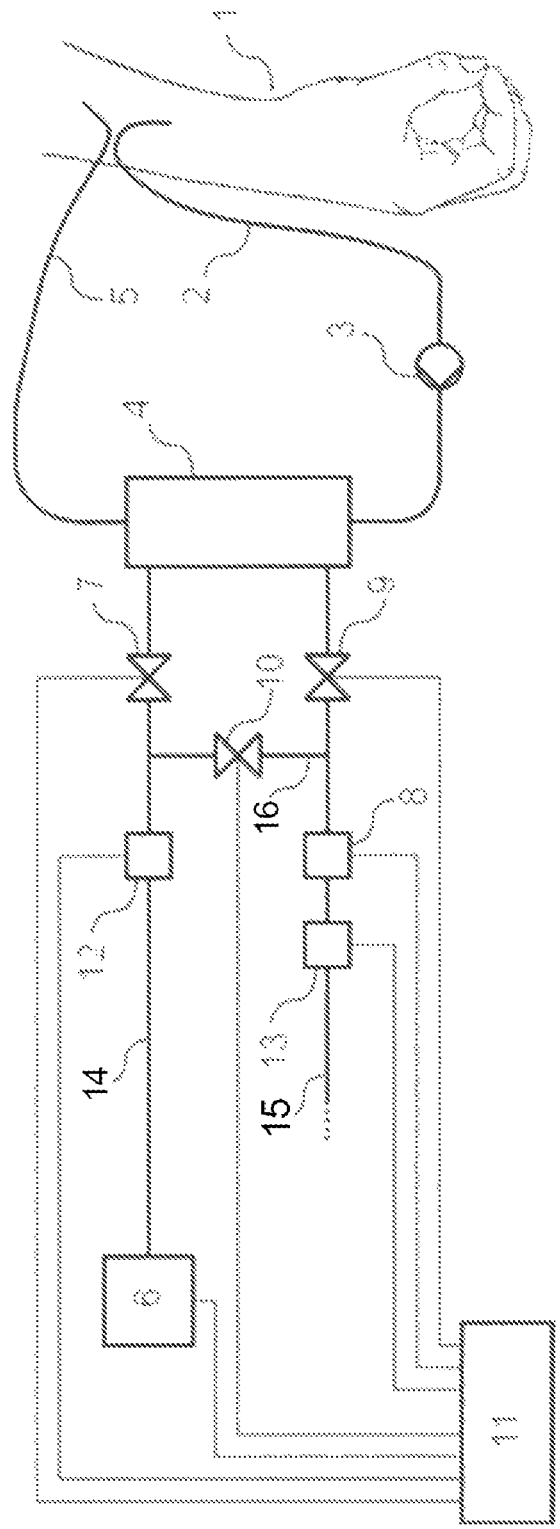

DEVICE AND METHOD FOR EXTRACORPOREAL BLOOD TREATMENT AND METHOD FOR THE BALANCE CONTROL OF A DIALYSIS LIQUID IN AN EXTRACORPOREAL BLOOD TREATMENT

CROSS-REFERENCES TO RELATED APPLICATIONS

This application is the United States national stage entry of International Application No. PCT/EP2020/073532, filed Aug. 21, 2020, and claims priority to German Application No. 10 2019 122 704.6, filed Aug. 23, 2019. The contents of International Application No. PCT/EP2020/073532 and German Application No. 10 2019 122 704.6 are incorporated by reference herein in their entireties.

FIELD

The present disclosure relates to a device and a method for extracorporeal blood treatment, in particular for hemodialysis, and to a method for the balance control of a dialysis fluid in an extracorporeal blood treatment.

BACKGROUND

In extracorporeal blood treatment (e.g., hemodialysis), the blood of a patient is passed through a dialyzer through which a dialysis fluid is passed at the same time. In the dialyzer, blood and dialysis fluid are brought into contact via a semi-permeable membrane so that an exchange of substances can take place between the patient's blood and the dialysis fluid. The aim of this type of dialysis treatment in a patient with kidney failure is to detoxify the blood and in addition remove excess water from the body.

The dialysis fluid consists of high-purity water, an alkaline first component (sodium hydrogen carbonate ($NaHCO_3$)) and an acidic second component. The latter is usually composed of sodium chloride (NaCl), potassium chloride (KCl), magnesium chloride ($MgCl_2$), calcium chloride ($CaCl_2$), acetic acid ($CH_3COOH$) and glucose. As a rule, dosing pumps and conductivity probes are used to prepare or proportion the dialysis fluid. Here, a probe measures the conductivity after the addition of the sodium hydrogen carbonate by means of a first dosing pump. Another probe detects the conductivity of the entire dialysis fluid after the acid component has also been added by means of a further dosing pump. In conductivity-controlled proportioning, the quantities added are controlled based on the measured conductivities.

In volumetric proportioning, the conductivity probes are only used for monitoring. Proportioning is here performed directly via the dosing pump delivery rates, which is why the exact composition of the employed components must be known.

The proper composition of the dialysis fluid is of great importance for the well-being and life expectancy of a patient. Sodium in particular plays an important role here, as it is the most abundant cation in both the dialysis fluid and the blood plasma. In patients with kidney insufficiency, the regulation of the water and electrolyte balance via the kidneys is severely restricted. For this reason, patients are dependent on keeping their water and sodium intake to a minimum. Sodium is particularly absorbed in the form of common salt (NaCl). A dialysis patient compensates for increased sodium intake by drinking a corresponding amount of liquid.

However, increased liquid intake means that more excess liquid must be removed from the patient by ultrafiltration during the next dialysis treatment. However, studies have shown that increased ultrafiltration rates are associated with higher mortality rates (Flythe, J. E.; Kimmel, S. E., Brunelli, S. M.: "Rapid fluid removal during dialysis is associated with cardio-vascular morbidity and mortality," *Kidney International*, 2010, 79, 250-257).

During dialysis, high ultrafiltration rates can also cause symptomatic blood pressure drops (Saran, R.; Bragg-Gresham, J.; Levin, N.; Twardowski, Z.; Wizemann, V.; Saito, A.; Kimata, N., Gillespie, B.: "Longer treatment time and slower ultrafiltration in hemodialysis: Associations with reduced mortality in the DOPPS," *Kidney International*, 2006, 69, 1222-1228).

To treat or avoid the latter, the patient is given NaCl injections or is dialyzed against a dialysis fluid with a relatively high sodium concentration. However, both measures again lead to increased water intake. A vicious circle begins.

An excessively low concentration of sodium in the dialysis fluid is, however, also disadvantageous for the patient. In the patient, the intracellular and extracellular spaces are in osmotic equilibrium with each other. A low sodium concentration in the dialysis fluid would lead to a drop in extracellular osmolarity (osmotic concentration) due to diffusion processes within the dialyzer. However, since both spaces are in equilibrium, water would diffuse from the intracellular space into the extracellular space. As a result, the cells would shrink, which can lead to dizziness, headaches, nausea, cramps and also blood pressure drops.

For the above mentioned reasons, it is therefore desirable to adjust the sodium concentration in the dialysis fluid individually such that the patient's plasma sodium concentration is changed as little as possible during treatment, and at best not at all. A dialysis of this type is referred to as isonatremic (de Paula, F. M.; Peixoto, A. J.; Pinto, L. V.; Dorigo, D.; Patricio, P. J. M., Santos, S. F. F.: "Clinical consequences of an individualized dialysate sodium prescription in hemodialysis patients," *Kidney International*, 2004, 66, 1232-1238; and Basile, C., Lomonte, C.: "It is Time to Individualize the Dialysate Sodium Prescription," *Seminars in Dialysis*, 2016, 29, 24-27).

The simplest approach would be to take a blood sample from the patient before each treatment and analyze it to adjust the sodium concentration in the dialysate liquid on this basis. However, this procedure is very time-consuming and expensive, and requires a lot of equipment. For this reason, dialysis is performed in many dialysis centers with a standardized composition of the dialysis fluid, although the plasma sodium concentration can vary from patient to patient (Mendoza, J. M.; Sun, S.; Chertow, G. M.; Moran, J.; Dass, S., Schiller, B.: "Dialysate sodium and sodium gradient in maintenance hemodialysis: a neglected sodium restriction approach?", *Nephrol Dial Transplant*, 2011, 26, 1281-1287).

A dialysis device with controlled dialysis fluid composition is disclosed in EP 0 097 366 A2. In this dialysis device, the electrolyte content of the dialysis fluid is detected before it enters the dialyzer and after it has left the dialyzer by means of two detectors, and the composition of the dialysis fluid is controlled based on the difference between the measured values obtained.

A dialysis device for performing an isonatremic dialysis and a method for sodium balancing in the dialysate circuit is known from WO 2010/112 223 A1. In particular, the conductivity of the dialysis fluid upstream and downstream of the dialyzer is determined in a dialysate circuit and compared with one another. The concentrations of bicarbonate and potassium in the patient's blood, which must be determined beforehand with the aid of an external measuring apparatus, are also required as further parameters.

DE 699 16 053 T2 describes a method for determining waste products in a dialysis fluid leaving a dialyzer, in which the content of a substance or of a combination of substances in the dialysis fluid is determined spectrophotometrically by means of a suitable measuring cell.

Kuhlmann, U.; Maierhofer, A.; Canaud, B.; Hoyer, J., Gross, M., "Zero Diffusive Sodium Balance in Hemodialysis Provided by an Algorithm-Based Electrolyte Balancing Controller: A Proof of Principle Clinical Study", *Artificial Organs*, Wiley, 2018, describe an algorithm for controlling the sodium concentration in the dialysis fluid of a hemodialysis or hemodiafiltration on the basis of conductivity measurements of the dialysis fluid upstream and downstream of the dialyzer.

A device and a method for carrying out isonatremic dialysis are also known from DE 10 2017 116 097 A1. In order to prevent the plasma sodium concentration in the patient's blood from changing as much as possible during the dialysis treatment, it is determined or estimated in advance by switching the dialysis device to a bypass mode at the beginning of the dialysis treatment, in which mode fresh dialysis fluid no longer flows through the dialyzer, but the patient's blood continues to flow through the dialyzer. After a certain time, the sodium concentration of the dialysis fluid in the dialyzer correlates with the patient's plasma sodium concentration and can be detected by means of a suitable measuring apparatus, such as a conductivity cell.

However, it has been shown that conductivity measurements on the dialysis fluid flowing out of the dialyzer, i.e. the used dialysis fluid, are influenced by substances that have passed from the blood into the dialysis fluid. Thus, a simple correlation between detected conductivity value and sodium concentration is not given.

Although sodium and the associated anions of the corresponding sodium salts, in particular chloride and hydrogen carbonate, make the largest contribution to the conductivity of a dialysis fluid, the conductivity measurement is influenced by further substances, so that a simple conversion between conductivity and sodium concentration is no longer possible. For example, increased potassium concentrations can increase the conductivity. However, there are also substances that are not conductive per se but can nevertheless impair conductivity because they reduce the mobility of the conducting ions. This effect is caused by toxins and other substances usually eliminated with the urine (hereinafter referred to as urophanic substances). Particularly at the beginning of a dialysis treatment, many of these substances pass through the semipermeable membrane in the dialyzer and thus reach the dialysate side. If the conductivity is reduced due to these substances, the proportioning of fresh dialysate liquid will result in too low a conductivity and thus too low a sodium concentration, so that the patient will be undesirably deprived of sodium in the course of dialysis treatment. A rigid correction of the conductivity by adding a fixed amount would also be disadvantageous, since the load of toxins may vary from patient to patient and from treatment to treatment.

The object of the invention is therefore to provide a device and a method for extracorporeal blood treatment, in particular for hemodialysis, with which the composition of the dialysis fluid can be adjusted automatically and individually for each patient, so that, among other things, zero-diffusive sodium balancing can be realized during dialysis, too. A further object of the present invention is to provide a simple yet accurate method for the balance control of a dialysis fluid during extracorporeal blood treatment, which only uses measured values detected on the dialysate side.

The device according to the invention for extracorporeal blood treatment, in particular for hemodialysis, comprises:
- a dialyzer rendering possible an exchange of substances between a patient's blood and a dialysis fluid,
- a proportioning unit which provides fresh dialysis fluid and is connected to the dialyzer via a supply line for supplying fresh dialysis fluid, the dialyzer further being connected to a discharge line for discharging used dialysis fluid from the dialyzer,
- a first measuring apparatus, provided in the supply line, for detecting the conductivity of the fresh dialysis fluid,
- a second measuring apparatus, provided in the discharge line, for detecting the conductivity of the used dialysis fluid, and
- a control unit connected to the proportioning unit and the measuring apparatuses for data exchange, characterized in that
- a third measuring apparatus is provided in the discharge line for measuring or estimating a loading of the used dialysis fluid with urophanic substances, and the third measuring apparatus is connected to the control unit for data exchange, and
- the control unit is designed to control in open-loop or closed-loop fashion the concentration of a substance in the fresh dialysis fluid provided by the proportioning unit during the blood treatment on the basis of the conductivities detected by the first measuring apparatus and the second measuring apparatus and the loading with urophanic substances detected or estimated by the third measuring apparatus in such a way that it is equal to the concentration of the substance in the used dialysis fluid or greater or less than the concentration of the substance in the used dialysis fluid by a predetermined value.

The dialyzer of the device according to the invention is preferably a commercially available dialyzer as used for extracorporeal blood treatments. It contains several hollow fiber capillaries characterized by a semipermeable membrane. Inside the dialyzer, the patient's blood flows through the capillaries, and the dialysis fluid flows around the capillaries on their outside and absorbs toxins and other contaminants from the patient's blood.

The device according to the invention further comprises a proportioning unit in which the fresh dialysis fluid used in dialysis is prepared. Preferably, principles are used for this which are generally known in the prior art. Examples are the variants described at the beginning, such as conductivity-controlled proportioning, volumetric proportioning or a mixed form of both. Usually, high-purity water, an alkaline first component and an acidic second component are mixed together for this purpose.

In order to distinguish the dialysis fluids, the present application refers to the dialysis fluid provided by the proportioning unit and supplied to the dialyzer as "fresh dialysis fluid" and the dialysis fluid leaving the dialyzer is referred to as "used dialysis fluid".

Furthermore, the device according to the invention comprises a supply line in the form of a fluid connection between the proportioning unit and the dialyzer in order to supply the fresh dialysis fluid to the dialyzer. The dialyzer is further connected to a discharge line which is used for discharging used dialysis fluid from the dialyzer and directing it to a drain.

A first measuring apparatus is provided in the supply line for detecting the conductivity of the fresh dialysis fluid. The first measuring apparatus is preferably a temperature-compensating conductivity cell, so that a temperature-compensated conductivity of the fresh dialysis fluid can be detected.

A second measuring apparatus is provided in the discharge line for detecting the conductivity of the used dialysis fluid. The second measuring apparatus is also preferably a temperature-compensating conductivity cell.

Further, the discharge line is provided with a third measuring apparatus which is arranged either upstream or downstream of the second measuring apparatus in the direction of flow. The third measuring apparatus is intended to determine or estimate the loading of the used dialysis fluid with urophanic substances. Preferably, the third measuring apparatus is an optical sensor that detects the absorption property of the used dialysis fluid, such as absorbance. Preferably, the absorption property is detected in the ultraviolet range between 235 nm and 400 nm. More preferably, the absorption property of light having a wavelength of 285±15 nm is detected. Alternatively, an enzymatic or another electrochemical sensor is also conceivable.

The terms "loading of the used dialysis fluid with urophanic substances" and "loading with urophanic substances" refer to the sum of all substances that pass from the patient's blood into the dialysis fluid during dialysis and are thus contained in the used dialysis fluid discharged from the dialyzer. In total, these substances change properties of the used dialysis fluid, such as the absorption properties, so that the extent of the loading of the used dialysis fluid with urophanic substances can at least be estimated by means of the third measuring apparatus.

The device according to the invention further comprises a control unit, which is connected to the proportioning unit and the three measuring apparatuses for exchange of data. The connection can be realized, for example, via suitable electrical lines and/or wirelessly. Due to this, it is possible to transmit the values detected by the measuring apparatuses to the control unit, drive the proportioning unit, and detect the status of all components connected to the control unit.

In addition, the control unit is designed in such a way that, on the basis of the conductivities detected by the first measuring apparatus and the second measuring apparatus and the loading with urophanic substances detected or estimated by the third measuring apparatus, it can control in open-loop or closed-loop fashion the concentration of a substance in the fresh dialysis fluid provided by the proportioning unit during blood treatment in such a way that it is equal to the concentration of the substance in the used dialysis fluid or is greater or less than the concentration of the substance in the used dialysis fluid by a predetermined value.

Preferably, the device according to the invention is used for carrying out a sodium balance control while according to a further preferred embodiment zero-diffusive sodium balance can also be realized with high accuracy during dialysis.

According to a preferred embodiment of the device according to the invention, this device further comprises:
 a first valve provided in the supply line,
 a second valve provided in the discharge line,
 a bypass line connecting the supply line upstream of the first valve to the discharge line downstream of the second valve, bypassing the dialyzer, and
 a third valve provided in the bypass line,
 the first measuring apparatus being provided in the supply line upstream of the bypass line, and the second measuring apparatus and the third measuring apparatus being provided in the discharge line downstream of the bypass line, and
 the valves being connected to the control unit for data exchange.

In this embodiment, a first valve is provided in the supply line and a second valve is provided in the discharge line, and furthermore a bypass line is provided as a fluid connection between the supply line and the discharge line to bypass the dialyzer, the bypass line being connected to the supply line upstream of the first valve and being connected to the discharge line downstream of the second valve. A third valve is also provided in the bypass line.

The three valves are connected to the control unit for data exchange, so that it is e.g. possible to drive the valves and detect their status.

The bypass line is arranged in such a way that the first measuring apparatus is provided in the supply line upstream of the bypass line and the second measuring apparatus and the third measuring apparatus are provided in the discharge line downstream of the bypass line.

With the first, second and third valves, the fluid flows in the supply line, the discharge line and the bypass line can be controlled in open-loop and/or closed-loop fashion independently of one another.

During the blood treatment and thus also during the detection of the conductivities by means of the first and second measuring apparatuses and during the detection or estimation of the loading of the used dialysis fluid with urophanic substances by means of the third measuring apparatus, the valves are driven by the control unit in such a way that the first and second valves are open and the third valve in the bypass line is closed.

As already indicated above, the control unit of the device according to the invention is designed in such a way that, on the basis of the conductivities detected by the first measuring apparatus and the second measuring apparatus and the loading with urophanic substances detected or estimated by the third measuring apparatus, the concentration of a substance in the fresh dialysis fluid provided by the proportioning unit can be controlled in open-loop or closed-loop fashion in such a way that it is equal to the concentration of the substance in the used dialysis fluid or is greater or less than the concentration of the substance in the used dialysis fluid by a predetermined value.

Since, as explained above, the conductivity measurement in the used dialysis fluid can be influenced by various substances contained therein, such as toxins, in such a way that a false value of the concentration of the substance to be determined is obtained, the loading of the used dialysis fluid with urophanic substances is measured or estimated by means of the third measuring apparatus in the device according to the invention. When calculating the concentration of the substance in the used dialysis fluid, the control unit takes into account the degree of loading with urophanic substances, thus rendering possible a more precise concentration determination. Based on this more accurate concentration value, the proportioning unit is able to provide, with improved accuracy, a fresh dialysis fluid that contains, for example, the same concentration of the substance as the used dialysis fluid. It is thus possible to ensure e.g. a more accurate isonatremic dialysis. Alternatively, if desired, a predetermined concentration difference of the substance between fresh and used dialysis fluid can be adjusted, so that the concentration of this substance in the patient's blood can be changed specifically and, above all, with improved accuracy.

Thus, with the device according to the invention, improved balance control of the dialysis fluid during dialysis is possible, so that it can be determined more precisely whether a substance dissolved in the dialysis fluid or how much of it is transferred to the patient's blood when passing through the dialyzer. It can also be more precisely determined whether a substance dissolved in the patient's blood, or how much of it, passes into the dialysis fluid when passing through the dialyzer. This ensures a more gentle dialysis treatment, since high ultrafiltration rates could be avoided in the medium and long term, and gentler changes in the patient's water and electrolyte balance can be realized.

The advantages of the device according to the invention and the method according to the invention are, among other things, that the concentration of a substance in the fresh dialysis fluid can be controlled in open-loop or closed-loop fashion during dialysis, i.e. continuously and without interrupting it. For this purpose, measured values are continuously detected during dialysis by means of the three measuring apparatuses and transmitted to the control unit, and the control unit continuously determines the composition of the fresh dialysis fluid on the basis of the measured values obtained.

Moreover, no additional method steps are required to determine the concentration of the substance in the patient's blood in order to adjust the proportioning of the fresh dialysis fluid accordingly thereto. This means that a patient-specific dialysis is possible even without drawing and analyzing the patient's blood. The bypass mode for determining or estimating the sodium concentration in the patient's blood, as required in DE 10 2017 116 097 A1, can also be omitted in the device according to the invention. Furthermore, it is not necessary to interrupt the dialysis while it proceeds if the concentration of the substance must be determined again.

According to a further preferred embodiment, the control unit is designed in such a way that a correlated conductivity of the used dialysis fluid can be calculated on the basis of the measured or estimated loading of the used dialysis fluid with urophanic substances and the detected conductivity of the used dialysis fluid, and that, on the basis of the corrected conductivity of the used dialysis fluid, the composition of the fresh dialysis fluid can be determined in such a way that the conductivity of the fresh dialysis fluid is equal to the corrected conductivity of the used dialysis fluid. Thus, for example, an isonatremic dialysis can be performed with improved accuracy using the device according to the invention.

The correction of the detected conductivity of the used dialysis fluid can be performed, for example, by mathematically combining the conductivity $C_{DO}$ measured by the second measuring apparatus and the absorbance A measured by the third measuring apparatus to obtain the corrected conductivity $C_{DO,corr}$:

$$C_{DO,corr} = f(C_{DO}, A)$$

In the simplest case, a linear equation offers itself. However, polynomials of higher order or an equation determined with the help of an artificial neural network are also conceivable. An alternative possibility is the use of a lookup table.

For example, if zero-diffusive sodium-balanced dialysis shall be carried out, the dialysis fluid is mixed together by the proportioning unit so that its conductivity $C_{DI}$ corresponds to the corrected conductivity of the used dialysis fluid $C_{DO,corr}$:

$$C_{DI} = C_{DO,corr}$$

If both conductivities are equal, there is no diffusive exchange of sodium ions between the blood side and the dialysate side in the dialyzer. The conductivity $C_{DI}$ or $C_{DO,corr}$ thus also corresponds to the plasma water conductivity $C_{BP}$, which is proportional to the plasma sodium concentration in the patient's blood. It is therefore also possible, after initially determining the plasma sodium concentration, to adjust the dialysis fluid in such a way that a defined amount of sodium can be withdrawn from or administered to the patient. The sodium flow $\Delta J$ is here calculated to be:

$$\Delta J = k \cdot Q_D \cdot (C_{DI} - C_{DO,corr}) + k \cdot Q_{UF} \cdot C_{DO,corr}$$

with the dialysis fluid flow $Q_D$, the ultrafiltration rate $Q_{UF}$, and a factor k used to convert the conductivity to a sodium concentration, although again more complex conversions may be used here as well.

Furthermore, the present invention makes it possible to determine the absolute amount of sodium removed. Either on the basis of the previous equation, taking into account the duration of therapy, or: if the ultrafiltration volume is known and the plasma sodium concentration in the course of dialysis treatment is known, the amount of sodium removed corresponds to the product of ultrafiltration volume and plasma sodium concentration.

When the first valve and the second valve are closed and the third valve is opened in the device according to the invention, the device is in by-pass. The dialysate liquid then flows unaffected by the dialyzer through the third valve, past the second and third measuring apparatuses and into the drain. In this state, the same liquid flows through the first and second measuring apparatuses, so that the state of the bypass can be used to compare the functional principle of both sensors and to set possible differences to zero by an adjustment. Furthermore, the state of the bypass can be used to calibrate the third measuring apparatus, since fresh dialysis fluid is required for calibration.

The device according to the invention can further comprise a balancing unit designed to determine how much water is removed from the patient's blood during blood treatment. The balancing unit can, for example, ensure that exactly the precisely prescribed amount of excess water is withdrawn from the patient by comparing and, if necessary, adjusting the flow rate of the dialysis fluid.

In the method according to the invention for extracorporeal blood treatment, in particular for hemodialysis, by means of a dialyzer which renders possible an exchange of substances between a patient's blood and a dialysis fluid, the conductivities of a fresh dialysis fluid supplied to the dialyzer and of a used dialysis fluid discharged from the dialyzer are detected during the blood treatment, and a loading of the used dialysis fluid with urophanic substances is measured or estimated. Furthermore, a control unit determines the composition of the fresh dialysis fluid on the basis of the data of the conductivities and the loading with urophanic substances in such a way that the concentration of a substance in the fresh dialysis fluid is equal to the concentration of the substance in the used dialysis fluid, or is greater or less than the concentration of the substance in the used dialysis fluid by a predetermined value, and a proportioning unit provides a fresh dialysis fluid with the composition determined by the control unit for supply to the dialyzer.

If, according to a preferred embodiment of the method according to the invention, the composition of the fresh dialysis fluid shall be determined in such a way that the concentration of the substance in the fresh dialysis fluid is equal to the concentration of the substance in the used dialysis fluid, such as in the case of isonatremic dialysis, the control unit calculates a corrected conductivity of the used dialysis fluid on the basis of the measured or estimated loading of the used dialysis fluid with urophanic substances and the detected conductivity of the used dialysis fluid, and determines the composition of the fresh dialysis fluid in such a way that the conductivity of the fresh dialysis fluid is equal to the corrected conductivity of the used dialysis fluid.

In the extracorporeal blood treatment method according to the invention, the concentration of the substance in the dialysis fluid is preferably a sodium concentration. Thus, a more accurate sodium balancing, preferably a zero-diffusive sodium balancing, can be realized during dialysis.

With the extracorporeal blood treatment method according to the invention, the same advantages are achieved as mentioned above in the explanation of the extracorporeal blood treatment device according to the invention.

According to the present invention, there is further provided a method for balance control or monitoring of a dialysis fluid in an extracorporeal blood treatment, in particular a hemodialysis, in which the dialysis fluid flows through a dialyzer. In this method, the conductivities of a fresh dialysis fluid supplied to the dialyzer and of a used dialysis fluid discharged from the dialyzer are detected, and a loading of the used dialysis fluid with urophanic substances is measured or estimated. In addition, the composition of the fresh dialysis fluid is determined by means of a control unit on the basis of the data of the conductivities and the loading with urophanic substances in such a way that the concentration of a substance in the fresh dialysis fluid is equal to the concentration of the substance in the used dialysis fluid, or is greater or smaller by a predetermined value than the concentration of the substance in the used dialysis fluid, and, on the basis of the composition determined by the control unit, a proportioning unit provides a fresh dialysis fluid with this composition for supply to the dialyzer.

If, for the dialysis to be carried out, the composition of the fresh dialysis fluid is determined in such a way that the concentration of the substance in the fresh dialysis fluid is equal to the concentration of the substance in the used dialysis fluid, as for example in the case of isonatremic dialysis, according to a preferred embodiment of the method for balance control of a dialysis fluid, the control unit calculates a corrected conductivity of the used dialysis fluid on the basis of the measured or estimated loading of the used dialysis fluid with urophanic substances and the detected conductivity of the used dialysis fluid and determines the composition of the fresh dialysis fluid in such a way that the conductivity of the fresh dialysis fluid is equal to the corrected conductivity of the used dialysis fluid.

In the method for balance control or monitoring of a dialysis fluid during extracorporeal blood treatment according to the invention, the concentration of the substance in the dialysis fluid is preferably a sodium concentration. Thus, a more accurate sodium balancing, preferably a zero-diffusive sodium balancing, can be realized during dialysis.

With the method for balance control or monitoring of a dialysis fluid during extracorporeal blood treatment according to the invention, the same advantages are achieved as mentioned above in the explanation of the extracorporeal blood treatment device according to the invention.

The method for extracorporeal blood treatment explained above as well as the method for balance control of a dialysis fluid in an extracorporeal blood treatment are preferably carried out using the extracorporeal blood treatment device according to the invention.

Part of both procedures can also be, according to a preferred embodiment, the implementation of a bypass mode, in which the first valve and the second valve are closed and the third valve is opened. In this state, the same fluid flows through the first and the second measuring apparatus so that the state of the bypass can be used to compare the functional principle of both sensors and to set possible differences to zero by an adjustment. Furthermore, the state of the bypass can be used to calibrate the third measuring apparatus, since fresh dialysis fluid is required for calibration.

In both the device according to the invention and the methods according to the invention, data of the measuring apparatuses and/or characteristics of the dialysis fluid mixed by the proportioning unit can be displayed on a screen or a data management system according to preferred embodiments in order to make the processes transparent for the medical personnel and/or the user. This relates in particular to conductivities, concentrations, absorbances, pH values, temperatures and/or pressures. According to a further embodiment, it may be provided that certain data is only made available as a recommendation. Thus, the medical personnel can decide for themselves, based on this recommended data, whether or not the recommendation should be followed, i.e. a hypo-, iso- or hypernatremic dialysis is not carried out automatically according to this embodiment.

According to preferred embodiments of the device or method, collected data can be stored on a patient's card, in the dialysis machine and/or in a data management system. Studies conducted in recent years have shown that the plasma sodium concentration of a patient is relatively constant compared to other parameters (setpoint theory):

Peixoto, A. J.; Gowda, N.; Parikh, C. R., Santos, S. F. F.: "Long-Term Stability of Serum Sodium in Hemodialysis Patients," *Blood Purif,* 2010, 29, 264-267, Keen, M. L., Gotch, F. A.: "The association of the sodium setpoint to interdialytic weight gain and blood pressure in hemodialysis patients", *The International Journal of Artificial Organs,* 2007, 30, 971-979, and Hecking, M.; Kainz, A.; Hörl, W. H.; Herkner, H., Sunder-Plassmann, G.: "Sodium Setpoint and Sodium Gradient: Influence on Plasma Sodium Change and Weight Gain," *Am J Nephrol,* 2011, 33, 39-48.

Thus, the stored data, in particular the conductivities $C_{DI}$ and the corrected conductivity $C_{DO,corr}$ as well as the difference and absorbance A determined therefrom, can be evaluated by means of descriptive statistics (e.g., mean value, standard deviation, temporal correlations) to still detect any changes, which might indicate a general change in health status.

BRIEF DESCRIPTION OF THE DRAWING FIGURE

The FIGURE is a schematic diagram of an embodiment of the extracorporeal blood treatment device according to the invention.

DETAILED DESCRIPTION

A schematic implementation of the device according to the invention is shown in the FIGURE. Blood is withdrawn from a dialysis patient 1 via the arterial tubing system 2 with the aid of a delivery device 3. The blood enters a dialyzer 4, where it is freed from toxins and excess water by means of diffusion and/or ultrafiltration. It is then returned to the patient via the venous tubing system 5. Withdrawal and return via a common cannula is also conceivable.

The dialyzer 4 is a commercially available dialyzer as described above, which is used for extracorporeal blood treatments. The dialysis fluid is prepared in the proportioning unit 6. The first measuring apparatus 12, provided in the supply line 14, measures a temperature-compensated conductivity of the fresh dialysis fluid.

In the main circuit, i.e. when the dialysis fluid flows through the dialyzer 4, the third valve 10 provided in a bypass line 16 connecting the supply line 14 upstream of the first valve 7 to the discharge line 15 downstream of the second valve 9, bypassing the dialyzer 4, is closed. The fresh dialysis fluid thus flows through the supply line 14 with the first measuring apparatus 12 and through the first valve 7 into the dialyzer 4, where it absorbs the contaminants from the blood and, if necessary, releases other substances, in particular hydrogen carbonate and/or other electrolytes or non-electrolytes, into the blood. After passing through the dialyzer 4, the used dialysis fluid passes through the second valve 9 as well as the second measuring apparatus 8 and the third measuring apparatus 13 in the discharge line 15. The measuring apparatus 8 is the same measuring apparatus as the first measuring apparatus 12. The third measuring apparatus 13 is provided to determine or estimate the loading of the used dialysis fluid with urophanic substances. In the present embodiment, this is an optical sensor that measures the absorption property of the used dialysate in the ultraviolet range between 235 nm and 400 nm. Preferably, the absorption property of light with a wavelength of 285±15 nm is measured. Alternatively, an enzymatic or other electrochemical sensor is also conceivable.

The control unit 11 detects the measured values and states of the measuring apparatuses 8, 12 and 13, of the proportioning unit 6 and of the valves 7, 9 and 10. Furthermore, it outputs commands to the proportioning unit 6 and to the valves 7, 9 and 10.

The invention claimed is:

1. A device for extracorporeal blood treatment comprising:
a dialyzer configured to exchange substances between a patient's blood and a dialysis fluid, the dialyzer being connected to a discharge line for discharging used dialysis fluid from the dialyzer;
a proportioning unit configured to provide fresh dialysis fluid, the proportioning unit connected to the dialyzer via a supply line for supplying fresh dialysis fluid;
a first measuring apparatus provided in the supply line for detecting a conductivity of the fresh dialysis fluid;
a second measuring apparatus provided in the discharge line for detecting a conductivity of the used dialysis fluid;
a control unit connected to the proportioning unit, the first measuring apparatus, and the second measuring apparatus for data exchange; and
a third measuring apparatus provided in the discharge line for generating a single value indicative of a sum of all substances that pass from the patient's blood into the dialysis fluid, the third measuring apparatus being connected to the control unit for data exchange,
the control unit being configured to continuously control in open-loop or closed-loop fashion a concentration of a substance in the fresh dialysis fluid provided by the proportioning unit during blood treatment based on conductivities continuously detected during blood treatment by the first measuring apparatus and the second measuring apparatus and the single value indicative of the sum of all substances that pass from the patient's blood into the dialysis fluid generated by the third measuring apparatus in such a way that the concentration of a substance in the fresh dialysis fluid is equal to the concentration of the substance in the used dialysis fluid or is greater or less than the concentration of the substance in the used dialysis fluid by a predetermined value.

2. The device according to claim 1, further comprising:
a first valve provided in the supply line;
a second valve provided in the discharge line;
a bypass line connecting the supply line upstream of the first valve to the discharge line downstream of the second valve, bypassing the dialyzer; and
a third valve provided in the bypass line,
wherein the first measuring apparatus is provided in the supply line upstream of the bypass line, and the second measuring apparatus and the third measuring apparatus are provided in the discharge line downstream of the bypass line, and
wherein the first, second and third valves are connected to the control unit for data exchange.

3. The device according to claim 2, wherein the control unit is configured to drive the first, second and third valves during blood treatment and during detection of the conductivities by the first measuring apparatus and the second measuring apparatus and during detection or estimation of the loading of the used dialysis fluid with urophanic substances by the third measuring apparatus in such a way that the first and second valves are open and the third valve is closed.

4. The device according to claim 1, wherein the control unit is configured:
to calculate a corrected conductivity of the used dialysis fluid based on the loading of the used dialysis fluid with urophanic substances and the conductivity of the used dialysis fluid, and
to determine a composition of the fresh dialysis fluid based on the corrected conductivity of the used dialysis fluid so that the conductivity of the fresh dialysis fluid is equal to the corrected conductivity of the used dialysis fluid.

5. The device according to claim 1, wherein the first measuring apparatus and the second measuring apparatus detect temperature-compensated conductivities.

6. The device according to claim 1, wherein the third measuring apparatus is an optical sensor, an enzymatic sensor or another electrochemical sensor.

7. The device according to claim 6, wherein the third measuring apparatus is an optical sensor that detects light absorption in a wavelength range from 235 nm to 400 nm.

8. A method for extracorporeal blood treatment using a dialyzer configured to exchange substances between a patient's blood and a dialysis fluid, the method comprising the steps of:
detecting conductivities of a fresh dialysis fluid supplied to the dialyzer and of a used dialysis fluid discharged from the dialyzer during blood treatment;
generating a single value indicative of a sum of all substances that pass from the patient's blood into the dialysis fluid during blood treatment;
determining a composition of the fresh dialysis fluid with a control unit based on said conductivities of the fresh dialysis fluid and the single value indicative of the sum of all substances that pass from the patient's blood into the dialysis fluid in such a way that a first concentration of a substance in the fresh dialysis fluid is equal to a second concentration of the substance in the used dialysis fluid, or is greater or less than the second concentration of the substance in the used dialysis fluid by a predetermined value; and providing a fresh dialysis fluid with the composition for supply to the dialyzer.

9. The method according to claim 8, wherein, when the composition is determined such that the concentration of the substance in the fresh dialysis fluid is equal to the concentration of the substance in the used dialysis fluid, the control unit calculates a corrected conductivity of the used dialysis fluid based on the loading of the used dialysis fluid with urophanic substances and the conductivity of the used dialysis fluid, and determines the composition of the fresh dialysis fluid in such a way that the conductivity of the fresh dialysis fluid is equal to the corrected conductivity of the used dialysis fluid.

10. A method for balance control or monitoring of a dialysis fluid in an extracorporeal blood treatment, in which the dialysis fluid flows through a dialyzer, the method comprising the steps of:

detecting conductivities of a fresh dialysis fluid supplied to the dialyzer and of a used dialysis fluid discharged from the dialyzer during blood treatment;

generating a single value indicative of a sum of all substances that pass from the patient's blood into the dialysis fluid during blood treatment;

determining a composition of the fresh dialysis fluid based on said conductivities of the fresh dialysis fluid and the single value indicative of the sum of all substances that pass from the patient's blood into the dialysis fluid with a control unit in such a way that a first concentration of a substance in the fresh dialysis fluid is equal to a second concentration of the substance in the used dialysis fluid, or is greater or less than the second concentration of the substance in the used dialysis fluid by a predetermined value; and providing a fresh dialysis fluid with the composition determined by the control unit for supply to the dialyzer.

11. The method according to claim 10, wherein, when the composition is determined such that the first concentration of the substance in the fresh dialysis fluid is equal to the second concentration of the substance in the used dialysis fluid, the control unit calculates a corrected conductivity of the used dialysis fluid based on the single value indicative of the sum of all substances that pass from the patient's blood into the dialysis and the conductivity of the used dialysis fluid, and determines the composition of the fresh dialysis fluid in such a way that the conductivity of the fresh dialysis fluid is equal to the corrected conductivity of the used dialysis fluid.

12. The method according to claim 10, wherein the substance is sodium.

13. The method according to claim 10, wherein the method is carried out using a device for extracorporeal blood treatment comprising:

a dialyzer configured to exchange substances between a patient's blood and a dialysis fluid;

a proportioning unit, which provides fresh dialysis fluid and is connected to the dialyzer via a supply line for supplying fresh dialysis fluid, the dialyzer being connected to a discharge line for discharging used dialysis fluid from the dialyzer;

a first measuring apparatus, provided in the supply line, for detecting a conductivity of the fresh dialysis fluid;

a second measuring apparatus, provided in the discharge line, for detecting a conductivity of the used dialysis fluid; and a control unit connected to the proportioning unit, the first measuring apparatus, and the second measuring apparatus for data exchange.

14. The device according to claim 1, wherein the control unit is configured to continuously control the concentration of the substance in the fresh dialysis fluid provided by the proportioning unit during blood treatment based on conductivities continuously detected during blood treatment by the first measuring apparatus and the second measuring apparatus and the single value indicative of the sum of all substances that pass from the patient's blood into the dialysis fluid generated by the third measuring apparatus by implementing at least the formula:

$$C_{DO,corr}=f(C_{DO},A),$$

where $C_{DO}$ is a conductivity measured by the second measuring apparatus and A is an absorbance measured by the third measuring apparatus.

15. The method according to claim 8, wherein determining the composition of the fresh dialysis fluid with the control unit based on said conductivities of the fresh dialysis fluid and the single value indicative of the sum of all substances that pass from the patient's blood into the dialysis comprises implementing at least the formula:

$$C_{DO,corr}=f(C_{DO},A),$$

where $C_{DO}$ is the detected conductivity of the used dialysis fluid, and A represents the single value indicative of the sum of all substances that pass from the patient's blood into the dialysis fluid.

16. The method according to claim 10, wherein determining a composition of the fresh dialysis fluid based on said conductivities of the fresh dialysis fluid and the single value indicative of the sum of all substances that pass from the patient's blood into the dialysis comprises implementing at least the formula:

$$C_{DO,corr}=f(C_{DO},A),$$

where $C_{DO}$ is the detected conductivity of the used dialysis fluid, and A represents the single value indicative of the sum of all substances that pass from the patient's blood into the dialysis fluid.

* * * * *